O. J. HACKBARTH.
VEHICLE WHEEL.
APPLICATION FILED FEB. 28, 1917.
1,223,785. Patented Apr. 24, 1917.
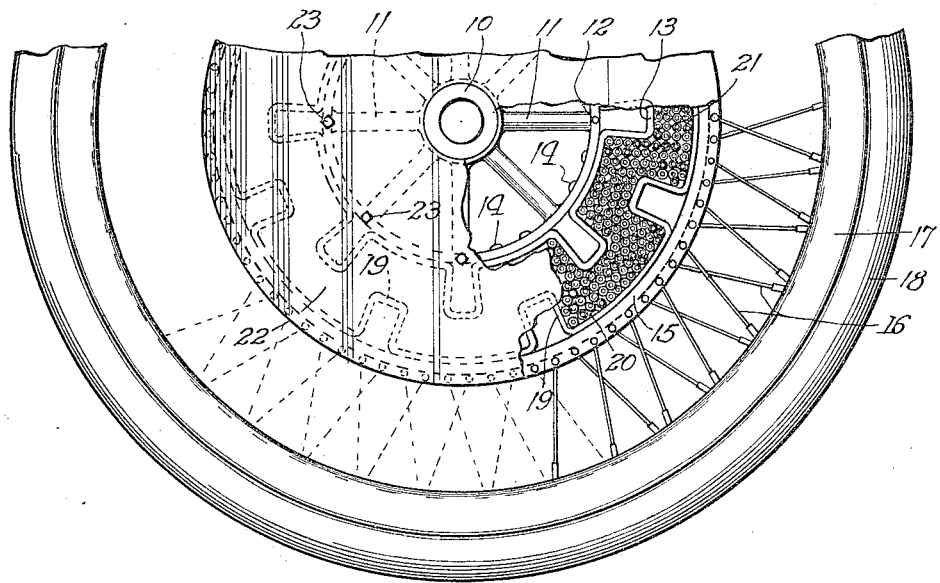
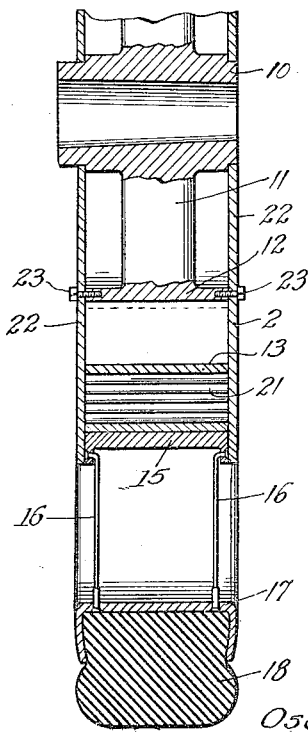
Witnesses
Robert H. Weir
Arthur W. Carlson
Inventor
Oscar J. Hackbarth
Fowle Boin & McCoy
Attys

UNITED STATES PATENT OFFICE.

OSCAR J. HACKBARTH, OF ELMHURST, ILLINOIS.

VEHICLE-WHEEL.

1,223,785.   Specification of Letters Patent.   Patented Apr. 24, 1917.

Application filed February 28, 1917. Serial No. 151,461.

*To all whom it may concern:*

Be it known that I, OSCAR J. HACKBARTH, a citizen of the United States, residing at Elmhurst, in the county of Dupage and State of Illinois, have invented certain new and useful Improvements in Vehicle-Wheels, of which the following is a specification.

This invention relates to improvements in vehicle wheels particularly to a resilient wheel with which a hard rubber tire may be used instead of the trouble causing pneumatic tire which with the commonly used type of rigid wheel construction is essential to the comfort of the passengers and the durability of the mechanism.

One of the objects of my invention is to provide a resilient wheel of simple, inexpensive construction and without pneumatic cushions or metal springs.

Another object of my invention is the provision of such a wheel which will have a high degree of resiliency and efficiency under varying conditions of operations.

A still further object is to provide such a wheel in which the resilient members may be readily removed and replaced by others of different size, thus permitting a proportioning of the degree of resiliency to the load being carried.

Still other and further objects will become readily apparent to those skilled in the art from a consideration of the description and drawings, wherein:

Figure 1 is a side elevation of a portion of a wheel embodying my invention, parts being broken away to show the interior construction, and Fig. 2 is a transverse vertical sectional view through the center of the wheel.

In the drawings I have illustrated a single embodiment of my invention for the purpose of making a full and adequate disclosure thereof though it is obvious that many changes might be made in the details or arrangement of parts without departing from the spirit and the scope of the appended claims.

The wheel comprises in general a central hub structure with an outer annular tire carrying member. The opposing faces of the two members are provided with intermeshing spaced apart fingers or projections and the area between the two members surrounding these extensions is packed tight with short tubular sections of rubber or fabric, serving as a cushion resiliently connecting the hub of the wheel with its peripheral treads.

In the specific embodiment illustrated the numeral 10 indicates a wheel hub from which radiates a series of short stubby spokes 11 terminating in an annular drum 12. Secured upon the periphery of the drum 12 is a sheet metal strip bent outwardly at intervals to form U-shaped projections 13, the strip being fastened to the drum 12 between the projections 13 by means of rivets 14.

Surrounding the drum 12 and spaced radially outwardly therefrom is a second drum or cylinder 15 from which radiates the wire spokes 16 connecting the same with a tire rim 17 in which is set the solid rubber tire 18. On the inner surface of cylinder 15 I have provided a sheet metal strip similar to that mounted on the hub and provided with inwardly extending U-shaped projections 19, the strip intermediate the projections being secured to the ring 15 by means of rivets 20.

The arrangement and length of the U-shaped projections 13 and 19 are such as to overlap the end of the projection 19 lying inside a circle passing through the outer end of the projection 13. The projections are spaced apart so as to provide a circuitous interdental path or opening in which I have tightly packed a plurality of small rubber tubes 21, the length of the tubes being equal to the thickness of the wheel. The ends of the tubes are overlain by a sheet metal disk 22 positioned at each side of the wheel and extending from the hub 10 outwardly a short distance radially beyond the drum 15. The plates are secured as by means of bolts 23 to the drum 12 and therefore form a part of the hub structure.

It will be obvious from the above that the outer wheel structure is free to move with respect to the inner hub structure except in so far as such movement is resisted by the resiliency of the plurality of rubber tubes 21. A distinct advantage of such an arrangement is that the rubber tubes 21 may be removed and replaced by other tubes of either stiffer walls or larger in diameter for the purpose of varying the degree of resiliency of the wheel.

Whereas I have illustrated and described but a single embodiment of my invention it is evident that changes may be made therein without departing from the spirit and scope of the appended claims.

Having described my invention, what I claim is:

1. A resilient wheel comprising inner and outer concentric spaced apart annular members, projections on each member extending into the area lying therebetween, and a plurality of short resilient tubes of diameter materially less than the radial distance between the members packed tightly into the space between the members and projections.

2. A resilient wheel comprising inner and outer concentric spaced apart annular members, projections on each member extending into the area lying therebetween, a plurality of short resilient open ended rubber tubes of diameter materially less than the radial distance between the members packed tightly into the space between the members and projections, and annular plates overlying the ends of the tubes and secured to one of the members.

In testimony whereof I hereunto set my hand.

OSCAR J. HACKBARTH.

Copies of this patent may be obtained for five cents each, by addressing the "Commissioner of Patents, Washington, D. C."